(12) United States Patent
Zoller et al.

(10) Patent No.: US 6,365,254 B1
(45) Date of Patent: Apr. 2, 2002

(54) ROLL STABILIZING RELEASE LINER

(75) Inventors: Panu K. Zoller, Woodbury; Eugene G. Hennen, Lake Elmo, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/017,389

(22) Filed: Feb. 2, 1998

(51) Int. Cl.$^7$ .................................................. C09J 7/02
(52) U.S. Cl. ..................... 428/40.1; 428/40.2; 428/41.3; 428/41.5; 428/41.7; 428/41.8; 428/41.9; 428/212; 428/214; 428/346; 428/349; 428/354; 428/355; 428/409; 428/515; 428/520; 428/906
(58) Field of Search ................................ 428/40.1, 41.3, 428/41.5, 41.8, 41.9, 515, 520, 355 R, 906, 317.5, 40.2, 41.7, 212, 214, 346, 349, 352, 354, 409; 206/411

(56) References Cited

U.S. PATENT DOCUMENTS

| | | | |
|---|---|---|---|
| 2,816,655 A | * 12/1957 | Crozier et al. | 206/59 |
| 2,862,613 A | * 12/1958 | Klemka et al. | 428/41.8 |
| 4,287,255 A | * 9/1981 | Wong et al. | 428/343 |
| 4,545,843 A | * 10/1985 | Bray | 156/322 |
| 5,167,995 A | * 12/1992 | Johnson et al. | 428/40 |
| 5,178,924 A | * 1/1993 | Johnson et al. | 428/40 |
| 5,491,013 A | * 2/1996 | Holley | 428/40 |

FOREIGN PATENT DOCUMENTS

| | | | |
|---|---|---|---|
| EP | 0 460 841 A2 | 5/1991 | ............... C09J/7/02 |
| JP | 5-77591 A | * 3/1993 | |
| JP | 6-80846 | * 3/1994 | |

OTHER PUBLICATIONS

West JPO Abstract of JP 5–77591A; Matsuzaki et al.; Transparent Therma Adhesive Sheet, Mar. 1993.*

West JPO Abstract of JP 6–80846A; Kusayama et al.; Ethylene–Vinyl–Acetate Copolymer Compoistion And Roll Process, Mar. 1994.*

Derwent Abstract of JP 5–77591A; Mitsui Du Pont Polychemical; Transparent Heat Sensitive EVA Copolymer Sheet, Mar. 1993.*

Derwent Abstract of JP 6–80846A; Taoka Kagaku Kogyo; Ethylene Vinyl Acetate Copolymer Composition, Mar. 1994.*

* cited by examiner

Primary Examiner—Nasser Ahmad
(74) Attorney, Agent, or Firm—Harold C. Knecht III

(57) ABSTRACT

A release liner providing more roll stability (i.e., the coils forming the roll are less likely to fall apart when the roll is held suspended along its outer circumferential edge) when used with double-sided tape having a heat activated adhesive ("HAA") side and a pressure sensitive adhesive ("PSA") side. The release liner includes a front liner side comprising a release layer in contact with, bonded to and readily removable from the PSA side and a back liner side comprising a roll stability layer. The roll stability layer comprises an ethylene vinyl acetate and contacts the HAA side when the adhesive tape assembly is formed into a roll.

39 Claims, 1 Drawing Sheet

ROLL STABILIZING RELEASE LINER

FIELD OF THE INVENTION

This invention relates to release liners for supporting adhesive tapes, more particularly, to release liners which provide significant roll stability to narrow rolls of adhesive tape and, even more particularly, to release liners which provide significant stability to narrow rolls of double-sided adhesive tape, where the tape has a heat activated adhesive side and a pressure sensitive adhesive side. This invention also relates to such release liners in combination with an adhesive tape.

BACKGROUND OF THE INVENTION

Adhesive tapes have been useful in a variety of industrial and automotive applications. Double sided adhesive tapes have been used to bond together a variety of substrates or surfaces and are particularly useful for industrial and automotive applications. Double-sided adhesive tapes having a heat activated adhesive (HAA) side and a pressure sensitive adhesive (PSA) side (e.g., in the form of a foam core with a heat activated adhesive on one side and a pressure sensitive adhesive on the other side) have been found useful in bonding together substrates of dissimilar materials. For example, such tapes have been used to attach a rubber-type substrate (e.g., thermoplastic and thermoset olefinic elastomeric materials) to a metal or a painted metal surface. In particular, such attachment tape has been used to attach rubber-type weatherstrip to the painted metal surface of a vehicle. In such an application, the PSA is bonded to the painted metal surface and the HAA is bonded to the rubber-type substrate. Polyethylene (PE) and polypropylene (PP) materials have been used for the HAA, and acrylic adhesives and tapes (e.g., in the form of a foam core and adhesive) have been used for the PSA. Acrylic adhesives generally have excellent adhesion to metal and painted metal surfaces but generally do not bond well to rubber type materials. Heat activated adhesives such as, for example, polypropylene and ethylene acrylic acid copolymer containing materials have been used for bonding an acrylic adhesive layer to rubber-type materials.

Such double-sided attachment tapes are typically manufactured in wide sheets, laminated onto a release liner of matching width to form a tape assembly, and then wound into a roll. Such liners include a release side which is bonded to the PSA side of the tape during the lamination step. The liner is chosen to have a release side that is bondable to yet readily removable from the PSA side of the tape. One such liner that has been used in the past has an outer layer of high density polyethylene (HDPE) with a thickness of about 0.5 mils (0.0127 mm), a center layer of medium density polyethylene (MDPE) with a thickness of about 3 mils (0.0762 mm), and a second outer layer of low density polyethylene (LDPE) with a thickness of about 0.5 mils (0.0127 mm). The resulting wide roll of the tape assembly is then converted or separated (e.g., by slitting) into a plurality of narrower rolls of the tape assembly having the same width or varying widths, depending on the intended use(s) of the tape. For example, tape widths of about 0.5 in. (1.27 cm) or less have been used to bond weatherstrip to automobile door frames. The liner is left intact while the HAA is laminated to the weatherstrip using heat and pressure. The liner is then removed and the resulting weatherstrip composite is bonded to the auto body frame using the PSA side of the tape.

One problem encountered in the past has been the instability of narrow rolls of such tape assemblies which are made with tape having a HAA side and a PSA side. Since the PSA side is protected by the release liner, and not exposed, it is the HAA side that contacts the release liner, not the PSA side, when the tape assembly is wound into a roll. The coils or layers forming these prior narrow rolls have tended to slip and slide relative to one another, causing the roll to telescope and come apart. As a result, the diameter of such unstable narrow rolls has had to be limited because larger diameter rolls come apart easier. In addition, even such unstable narrow rolls with smaller diameters have had to be handled with great care to prevent them from coming apart. Such handling measures have included mounting the slit side of the narrow roll onto a support wafer (e.g., made of a high density polyethylene). The support wafer is then carried like a plate to support and prevent coils of the narrow roll from telescoping apart. Thus, the use of narrow rolls of such tape assemblies has been cumbersome, time consuming and costly.

Therefore, there is a need for a release liner which provides more stability to narrow rolls of adhesive tape assemblies containing tape with a HAA side and a PSA side.

SUMMARY OF THE INVENTION

The present release liner provides more roll stability (i.e., the coils forming the roll are less likely to fall apart when the roll is held suspended along its outer circumferential edge) when used with double-sided tape having a heat activated adhesive ("HAA") side and a pressure sensitive adhesive ("PSA") side. In this way, the present invention satisfies the need for more stable rolls, especially more stable narrow rolls, of adhesive tape assemblies containing tape with a HAA side and a PSA side.

In one aspect of the present invention, an adhesive tape assembly is provided which comprises a double-sided adhesive tape and a release liner according to the teachings of the present invention. The tape includes a front adhesive side comprising a HAA layer of a heat activated adhesive and a back adhesive side comprising a PSA layer of a pressure sensitive adhesive. As used herein, "heat activated adhesive" refers to an adhesive that bonds to a contacting substrate or other surface when enough heat is added to the adhesive. The release liner includes a front liner side comprising a release layer in contact with, bonded to and readily removable from the PSA layer and a back liner side comprising a roll stability layer. The roll stability layer comprises an ethylene vinyl acetate and contacts the HAA layer when the adhesive tape assembly is formed into a roll. The roll stability layer is also operatively adapted to provide the adhesive tape assembly with a substantial increase in roll stability when formed into a roll of narrow width.

The HAA layer has a contact surface which contacts the roll stability layer when the adhesive tape assembly is formed into a roll. It is desirable for the contact surface to have a smooth, shiny or glossy finish. Surprisingly, such a smooth, shiny or glossy finish on the contact surface of the HAA layer appears to improve the coefficient of friction between the contacting surfaces of the HAA layer and the roll stability layer. Even so, the adhesive tape assembly may also exhibit improved stability with the contact surface of the HAA layer having a matte finish.

The release layer may comprise any material suitable for functioning as a release layer for a pressure sensitive adhesive and being bondable to the roll stability layer. Alternatively, the surface of the release layer, in contact with the PSA layer, may be coated with a release material such as, for example silicone or fluorocarbon. However, it may be desirable to avoid the use of such release materials to avoid contamination by this material.

It is desirable for the roll stability layer to comprise an ethylene vinyl acetate ("EVA") that has a low enough vinyl acetate ("VA") content to prevent the roll stability layer from blocking with the HAA layer. It is also desirable for the ethylene vinyl acetate to have a high enough VA content to obtain a coefficient of friction between the roll stability layer and the HAA layer that maintains stability of a roll of the adhesive tape assembly.

It is desirable for the roll stability layer to comprise an ethylene vinyl acetate having a vinyl acetate content of less than about 28% by weight. It is also desirable for the ethylene vinyl acetate of the roll stability layer to have a vinyl acetate content in the range of greater than about 5% up to about 24% by weight. It is further desirable for the ethylene vinyl acetate of the roll stability layer to have a vinyl acetate content in the range of about 8% to about 20% by weight.

It may also be desirable for the roll stability layer to include an anti-blocking agent (e.g., diatomaceous earth, clay and talc) in sufficiently low amounts so as to not significantly affect the coefficient of friction of the roll stability layer, when measured against the HAA layer.

It is believed that roll stability for the adhesive tape assembly can occur when the roll stability layer has a coefficient of friction of at least about 0.55, when measured against the HAA layer. It is also believed that roll stability can occur when the roll stability layer has a coefficient of friction of greater than about 0.5, when measured against the HAA layer. It is further believed that roll stability can occur when the roll stability layer has a coefficient of friction greater than about 0.4, when measured against the HAA layer.

When the adhesive tape assembly has an overall thickness of about 0.052 inches (0.132 cm) and is wound into a roll, with the roll stability layer contacting the HAA layer, the roll exhibits roll stability (i.e., the coils forming the roll do not substantially telescope or fall apart when the roll is held suspended along its outer circumferential edge) even when the roll has a diameter that is at least about 20 times the width of the adhesive tape assembly. This is the minimum diameter to width ratio at which roll stability problems have been experienced with rolls of prior adhesive tape assemblies comprising a double-sided adhesive tape, with a HAA side and a PSA side, and a release liner releasably bonded to the PSA side.

In another aspect of the present invention, an adhesive tape assembly is provided which includes a double-sided adhesive tape and a release liner. The tape includes a front adhesive side comprising a HAA layer of a polyolefin heat activated adhesive and a back adhesive side comprising a PSA layer of a pressure sensitive adhesive. The release liner includes a front liner side and a back liner side. The front liner side comprises a release layer, which is in contact with, bonded to and readily removable from the PSA layer. The back liner side comprises a roll stability layer, which contacts the HAA layer when the adhesive tape assembly is formed into a roll. The roll stability layer has a contact surface which has a coefficient of friction, when measured against the HAA layer, which provides a substantial increase in roll stability (i.e., the coils forming the roll do not fall apart when the roll is held suspended along its outer edge) to a narrow width roll of the adhesive tape assembly In a further aspect of the present invention, a release liner is provided for use with a double-sided adhesive tape having a front adhesive side comprising a heat activated adhesive layer and a back adhesive side comprising a pressure sensitive adhesive layer. The release liner includes a front liner side comprising a release layer having an exposed contact surface bondable to and readily removable from the pressure sensitive adhesive layer; and a back liner side comprising a roll stability layer. The roll stability layer comprises an ethylene vinyl acetate and is operatively adapted (e.g., formulated) to provide a substantial increase in stability to a narrow width roll of an adhesive tape assembly formed by releasably bonding the release layer to the pressure sensitive adhesive side of the double-sided adhesive tape and then winding the resulting adhesive tape assembly into a roll.

The objectives, features, and advantages of the present invention will become apparent upon consideration of the present specification and the appended drawings.

DETAILED DESCRIPTION OF THE PRESENT INVENTION

Although the present invention is herein described in terms of specific embodiments, it will be readily apparent to those skilled in this art that various modifications, re-arrangements, and substitutions can be made without departing from the spirit of the invention. The scope of the present invention is thus only limited by the claims appended hereto.

Figure 1:
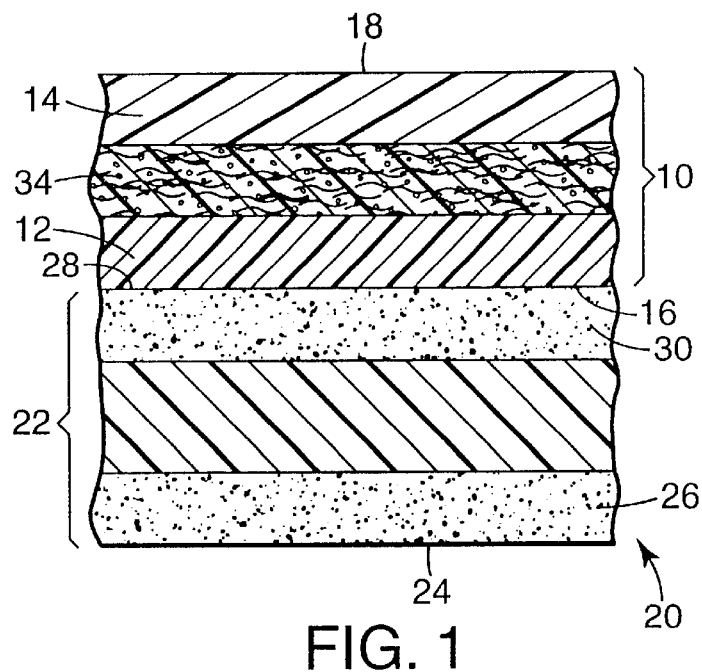
FIG. 1 is an enlarged cross-sectional view of a portion of one exemplary tape assembly according to the present invention.
Figure 2:
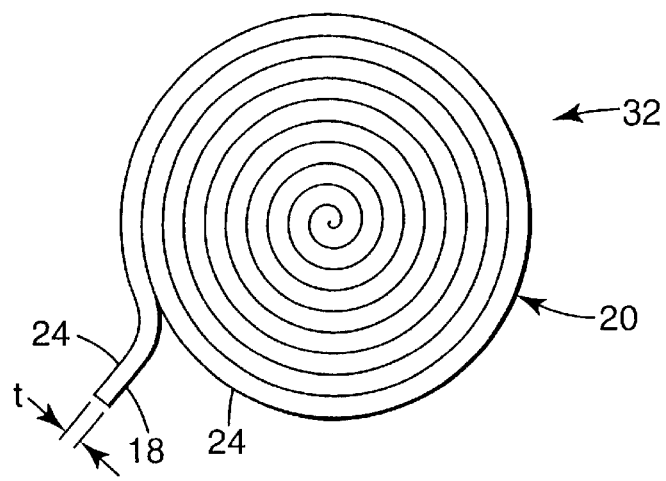
FIG. 2 is a side plan view of a tape assembly of narrow width and wound into a roll, according to the present invention.

Referring to FIG. 1, a release liner 10 according to the present invention is made with at least two layers, a release layer 12 and a roll stability layer 14. The layers 12 and 14 define a front liner side or surface 16 and a back liner side or surface 18 of the liner 10, respectively. An adhesive tape assembly 20 can be made, according to the present invention, by releasably bonding the liner 10 to a double-sided adhesive tape 22. The tape 22 includes a front adhesive side or surface 24 defined by a HAA layer 26 of a heat activated adhesive and a back adhesive side or surface 28 defined by a PSA layer 30 of a pressure sensitive adhesive. The release layer 12 is in contact with, bonded to and readily removable from the PSA layer 30. The roll stability layer 14 comprises an ethylene vinyl acetate and contacts the HAA layer 26 when the adhesive tape assembly 20 is formed into a roll. The roll stability layer 14 is also operatively adapted (e.g., formulated), as disclosed herein, to provide the adhesive tape assembly 20 with a substantial increase in roll stability when formed (e.g., convolutedly wound) into a roll 32 of narrow width.

The release layer 12 may comprise any material suitable for functioning as the release layer 12 and being bondable to the roll stability layer 14. It can be desirable for the release layer 12 to comprise a polyolefin such as, for example, a polyethylene, a polypropylene, a copolymer of a polyethylene and/or a polypropylene, or a blend of polyethylene and/or a polypropylene. Useful polyethylenes include high density polyethylene (HDPE), medium density polyethylene (MDPE), low density polyethylene (LDPE), linear low density polyethylene (LLDPE), and ultra-low density polyethylene (ULDPE). Medium density polyethylenes have a typical density in the range from about 0.93 g/cc to about 0.94 g/cc; low density polyethylenes have a typical density in the range from about 0.90 g/cc to about 0.92 g/cc; and linear low and ultra low density polyethylenes have densities below about 0.90 g/cc. The polyethylenes can be made by any method including use of conventional catalysts as well as metallocene catalysts. Desirable polyethylenes for the release layer 12 include MDPE, LDPE, LLDPE, and ULDPE.

The release layer 12 may also comprise, for example, silicone, perfluoroether or any other material suitable for functioning as the release layer 12. Alternatively, the surface of the release layer 12, in contact with the PSA layer 30, may be coated with a release material such as, for example silicone or fluorocarbon. As another alternative, the release layer 12 may be a coating of such a release material that is bonded to the roll stability layer 14. However, it may be desirable to avoid the use of such release materials to avoid contamination by this material.

It is desirable for the roll stability layer 14 to comprise a copolymer of an ethylene vinyl acetate ("EVA") that has a low enough vinyl acetate ("VA") content (e.g., less than about 28% by weight) to prevent the roll stability layer 14 from blocking with the HAA layer 26, when the tape assembly 20 is wound into a roll 32. Blocking occurs when, for example, the two contacting surfaces 18 and 24, respectively, of the liner 10 and the tape 22 adhere to one another with sufficient force to cause stretching, plastic deformation or tearing of the liner 10 and/or the tape 22 when the roll 32 is unwound. Blocking is also a concern when the liner 10 is separately wound into a roll. Therefore, it is also desirable for the VA content of the EVA to be low enough (e.g., less than about 28% by weight) to prevent the roll stability layer 14 from blocking with the release layer 12, when the release liner 10 is separately wound into a roll. It is also desirable for the ethylene vinyl acetate to have a high enough VA content (e.g., greater than about 5% by weight) to obtain a coefficient of friction between the roll stability layer 14 and the HAA layer 26 that maintains stability of a roll 32 of the adhesive tape assembly 20.

It is desirable for the roll stability layer 14 to comprise an ethylene vinyl acetate having a vinyl acetate content in the range of greater than about 5% to less than about 28% by weight. It is also desirable for the ethylene vinyl acetate of the roll stability layer 14 to have a vinyl acetate content in the range of greater than about 5% up to about 24% by weight. It is further desirable for the ethylene vinyl acetate of the roll stability layer 14 to have a vinyl acetate content in the range of about 8% to about 20% by weight. In addition, a VA content of about 12% by weight in the EVA of layer 14 has been found to prevent blocking between the layer 14 of EVA and a layer 12 of LDPE, without the need to use an anti-blocking agent, when the liner 10 is separately wound into a roll.

When the release layer 12 comprises a polyethylene ("PE"), the degree of blocking between a contacting PE layer 12 and EVA layer 14 of a rolled-up release liner 10 has been found to decrease as the density of the PE decreases. For example, it has been found desirable for a release layer 12 comprising a polyethylene to have a density of up to about 0.92 g/cc in order to be readily removable from the PSA layer 30 and to prevent blocking between the release layer 12 and the roll stability layer 14.

If it is desirable for the roll stability layer 14 to include an anti-blocking agent (e.g., diatomaceous earth, clay and talc), it should be in sufficiently low amounts so as not to significantly affect the coefficient of friction of the roll stability layer 14, when measured against the HAA layer 26. The addition of an anti-blocking should enable lower levels of VA to be used in the EVA of the roll stability layer 14. An anti-blocking agent may be added to the EVA of the roll stability layer 14 while layer 14 is being formed (e.g., by an extrusion process) to prevent blocking between the layer 14 and a release layer 12 of PE, when the release liner 10 is wound into a separate roll. Using an anti-blocking agent (i.e., diatomaceous earth in a polyethylene binder) made by Ampacet Corporation, Tarrytown, N.Y., under the product designation Ampacet 10063, in amounts up to about 5% by weight based on the amount of ethylene vinyl acetate, had little effect on the coefficient of friction between a roll stability layer 14 and a HAA layer 26. This anti-blocking agent was fed, by separate feed stream, into the extruder processing the EVA material so that the extruder mixed the EVA and the anti-blocking agent together.

It can be desirable for the release liner 10 to include an optional intermediate support layer 34 disposed between the release layer 12 and the roll stability layer 14 to provide the release liner 10 with additional structural support. Such additional support can be desirable, for example, in order to facilitate separation of the liner 10 from the adhesive tape 22. By making the liner 10 stiffer than the adhesive tape 22, with the addition of a suitable intermediate layer 34, it is usually easier to separate the liner 10 and the adhesive tape 22. The intermediate layer 34 may be a substantially continuous film, e.g., an extruded or solvent coated film, or may be a web, e.g., a non-woven, knit, woven, or other web, that has one or more holes or perforations therein, such as that disclosed in U.S. Pat. No. 5,167,995, which is incorporated herein by reference in its entirety. Satisfactory results have been obtained with an intermediate layer 34 comprising a high density polyethylene ("HDPE"). High density polyethylenes have a typical density of about 0.96 g/cc.

The release liner 10 of the present invention can be formed by co-extruding the various layers (e.g., the release layer 12 and the stabilizing layer 14) and laminating them together at the same time. Alternatively, the liner 10 can be formed by extruding one of the layers (e.g., the release layer 12) onto the another layer (e.g., the stabilizing layer 14). In either case conventional commercially available extruders and techniques well known in the art can be used. For example, conventional blown film extrusion equipment and techniques can be used to simultaneously co-extrude two or more layers (e.g., layers 12, 14 and 34). One extruder is used to extrude each layer material. The extruders force their corresponding layers through a common die. In this way, the various layers can be laminated together simultaneously as they are formed. In blown film extrusion, the laminated layers are extruded into the form of a tube. The tube is then collapsed, rolled flat and the edges trimmed to form two liners 10. The two liners 10 are then separated and, typically, each is wound into a roll for subsequent lamination to a double sided adhesive tape 22 to form a tape assembly 20. In the case where the release layer 12 is silicone or fluorocarbon, for example, the release layer 12 may be applied as a solvent based coating, a water based coating, or a 100% solids coating (i.e., the solids are in liquid form without a solvent) onto the stabilizing layer 14.

It is desirable for the HAA layer 26 to comprise an olefinic material, such as a polyolefin heat activated adhesive. Satisfactory results have been obtained with a HAA layer 26 comprising a polyethylene. The HAA layer 26 may also comprise a polypropylene, a copolymer of a polyethylene and/or a polypropylene, or a blend of polyethylene and/or a polypropylene. Satisfactory results have been obtained with a HAA layer 26 manufactured by Felix Schoeller Technology Papers, Inc. of Pulaski, N.Y. under the product designation M-906. The M-906 is a HAA layer 26 of ethylene-propylene polyallomer having a thickness of about 2.5 mils (0.064 mm). Satisfactory results have been obtained with a PSA layer 30 comprising an acrylic pressure sensitive adhesive. In particular, satisfactory results have been obtained with an acrylic PSA layer 30 which includes a foam core layer 36. The foam core layer 36 is disposed between the HAA layer 24 and the PSA layer 30.

The HAA layer 26 can be supplied on a paper release liner 10, corona treated and subsequently bonded to the PSA layer 30 or the foam core layer 36, depending on the tape construction desired. Alternatively, an intermediate primer layer can be used to improve the strength of the bond between the HAA layer 26 and the PSA layer 30 or the foam core layer 36. It is also desirable for the heat activated adhesive to be readily bondable to a wide range of thermoset and thermoplastic olefinic elastomers such as, for example, SANTOPRENE (manufactured by Monsanto, St. Louis, Mo.), ethylene propylene diene monomer (EPDM), polypropylene, high density polyethylene and low density polyethylene.

Referring to Pig. 2, the surface 24 of the HAA layer 26 contacts the surface 18 of the roll stability layer 14 when the adhesive tape assembly 20 is wound into a roll 32. Typically, when the assembly 20 is wound into a roll 32, the HAA layer 26 is left exposed. Unexpectedly, it has been found desirable for the contact surface 24 to have a smooth, shiny or glossy finish. Surprisingly, such a smooth, shiny or glossy finish on the contact surface 24 of the HAA layer 26 appears to improve the coefficient of friction between the contacting surfaces 24 and 18, respectively, of the HAA layer 26 and the roll stability layer 14. Even so, the adhesive tape assembly 20 may also exhibit improved stability with the contact surface 24 of the HAA layer 26 having a matte finish.

Satisfactory results have been obtained when the contact surface 24 of the HAA layer 26 of HAA (i.e., the M-906 described above) has a surface roughness (i.e., a degree of smoothness) ranging from about 8 microinches (0.0002 mm) to about 26 microinches (0.00066 mm), with an overall average surface roughness of about 13.5 microinches (0.000343 mm), as measured with a profilometer such as the POCKET SURF III® ( manufactured by Federal Products Corporation of Providence, R.I. Each of the surface roughness measurements (i.e., 26, 15, 9, 11, 15, 14, 8 and 10 microinches) used to obtain the overall average surface roughness of about 13.5 microinches (0.000343 mm) was itself an average value taken over about a half inch (1.27 cm) area of the surface being measured. Therefore, it is believed that satisfactory results can be obtained with an overall average surface roughness of less than or greater than the 13.5 microinches (0.000343 mm) actually measured. It is also believed satisfactory for the contact surface 24 of the HAA layer 26 to have an overall average surface roughness of up to and including about 26 microinches (0.00066 mm).

The contact surface for the layer of HAA (i.e., the M-906 described above) used in the past had a matte not a smooth, shiny or glossy finish. A sample of a prior layer of HAA had a surface roughness ranging from about 33 microinches (0.00084 mm) to about 48 microinches (0.0012 mm), with an overall average surface roughness of about 39.2 microinches (0.000996 mm). Each of the surface roughness measurements (i.e., 38, 33, 42, 35, 43, 37, 48, 37, 39, 39 and 40 microinches) used to obtain the overall average surface roughness of about 39.2 microinches (0.000996 mm) was itself an average value taken over about a half inch (1.27 cm) area of the surface being measured. Therefore, it is believed that satisfactory results may be obtained with the surface 24 of the HAA layer 26 having an overall average surface roughness of less than about 33 microinches (0.00084 mm) and, possibly, even less than about 39.2 microinches (0.000996 mm).

One theory for why roll stability occurs with the HAA layer 26 having a smooth, shiny or glossy contact surface 24 is that the surface 24 is smooth enough and the contact surface 18 of the roll stability layer 14 is tacky enough so that, when the two contact surfaces 18 and 24 are pressed against each other (e.g., when the adhesive tape assembly 20 is formed into a narrow width roll 32), the contact surface 18 of the roll stability layer 14 is able to wet-out onto the smooth contact surface 24 of the HAA layer 26. This wetting-out results in a substantial elimination of air being trapped (i.e., results in a vacuum being formed) between the HAA layer 26 and the roll stability layer 14, sort of like a suction-cup effect. Atmospheric pressure can then generate a normal force which tends to compress or hold together the contacting surfaces 24 and 18, respectively, of the HAA layer 26 and the roll stability layer 14. This atmospheric pressure induced normal force is of a magnitude that sufficiently increases the frictional forces between the contacting surfaces 18 and 24 to improve the stability of the narrow width roll 32.

The test data disclosed in the Table below indicates that roll stability for the adhesive tape assembly 20 can occur when the roll stability layer 14 has a kinematic coefficient of friction of about 0.577, when measured against a HAA layer 26 (i.e., the M-906 described above). Even so, it is believed that lower coefficients of friction may also provide significant improvements in roll stability. It is believed that roll stability for the adhesive tape assembly 20 can occur when the roll stability layer 14 has a coefficient of friction of at least about 0.55, when measured against the HAA layer 26. It is also believed that roll stability can occur when the roll stability layer 14 has a coefficient of friction of greater than about 0.5, when measured against the HAA layer 26. Based on the tabulated friction test results associated with prior liner and matte finish HAA layer, it is further believed that roll stability can occur when the roll stability layer 14 has a coefficient of friction greater than about 0.4, when measured against the HAA layer 26. The coefficients of friction tabulated below were obtained in accordance with the test procedures described herein.

TABLE

| Test # | Surface #1 | Surface #2 | C.O.F. |
|---|---|---|---|
| 1 | EVA | S-HAA | 0.726 |
| 2 | EVA | M-HAA | 0.577 |
| 3 | HDPE | S-HAA | 0.374 |
| 4 | HDPE | M-HAA | 0.335 |

EVA = Ethylene Vinyl Acetate
HDPE = High Density Polyethylene
S-HAA = Shiny HAA (M-906)
M-HAA = Matte Finish HAA (M-906)

Coefficient of Friction Test Procedures

The coefficient of friction between each of the heat activated adhesives (S-HAA and M-HAA) and each of the liner layers (EVA and HDPE) were determined according to ASTM D4518-91 with the following changes. An inclined plane test apparatus was used having dimensions of 45.7 cm by 20.3 cm. The test was conducted using a block weighing 8.75 pound (3.98 kg) and measuring 10.2 cm by 10.2 cm. A test film of ethylene vinyl acetate, containing 12% by weight vinyl acetate, served as the present release liner 10 (i.e., roll stability layer 14) and was taped to the surface of the inclined plane and a test film of each heat activated adhesive, S-HAA and M-HAA, was taped to a block. The S-HAA and the M-HAA films had an overall average surface roughness of about 13.5 microinches (0.000343 mm) and 39.2 microinches (0.000996 mm), respectively. Likewise, a test film of high density polyethylene served as the prior art release liner and was also taped to the surface of the inclined plane. For both the EVA and the HDPE test film, each block was placed on the inclined plane at 0°. The inclined plane was then raised until the block started to slide down the plane. The tangent of the angle of the inclined plane was then measured as the coefficient of friction of the two surfaces.

Figure 3:
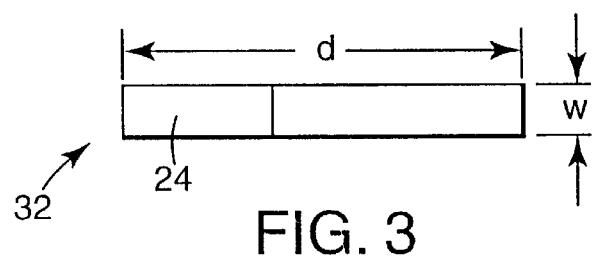
FIG. 3 is an edge view of the tape assembly roll of FIG. 2.

Referring to FIG. 3, when the adhesive tape assembly 20 has an overall thickness of about 0.052 inches (0.132 cm) and is wound into a roll 32, with the roll stability layer 14 contacting the HAA layer 26, the roll exhibits roll stability (i.e., the coils forming the roll 32 do not substantially telescope or fall apart when the roll 32 is held suspended along its outer circumferential edge) when the roll 32 has a diameter d that is at least about 20 times the width w of the adhesive tape assembly 20. This is the minimum diameter to width ratio at which roll stability problems have been experienced with rolls of prior adhesive tape assemblies comprising a double-sided adhesive tape, with a HAA side and a PSA side, and a release liner releasably bonded to the PSA side.

A typical example of an adhesive tape assembly 20, used to form a narrow roll 32 according to the present invention, has a width w of up to about 1 inch (2.54 cm), a thickness of about 0.052 inches (0.132 cm) and a length in the range of from about 36 yards (33 m) to about 144 yards (132 m) and, it is believed, even longer. For many applications, the present adhesive tape assemblies will have a width w of up to about 0.5 inches (1.27 cm). Prior adhesive tape assemblies having a length of about 36 yards (33 m), a thickness of about 0.051 inches (0.129 cm) and a width w of about 5 mm (0.196 inches) were wound into a roll 32 having a roll diameter to width ratio of about 49.7. Prior adhesive tape assemblies having a length of about 72 yards (65.8 m), a thickness of about 0.051 inches (0.129 cm) and a width w of about 0.25 inches (0.635 cm) were wound into a roll 32 having a roll diameter to width ratio of about 60. Prior adhesive tape assemblies having a length of about 108 yards (98.8 m), a thickness of about 0.051 inches (0.129 cm) and a width w of about 0.5 inches (1.27 cm) were wound into a roll 32 having a roll diameter to width ratio of about 33.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows and equivalents thereof.

What is claimed is:

1. An adhesive tape assembly comprising:
    a double-sided adhesive tape comprising:
        a front adhesive side comprising a heat-activated adhesive layer, and
        a back adhesive side comprising a pressure-sensitive adhesive layer; and
    a release liner comprising:
        a front liner side comprising a release layer in contact with, bonded to and removable from said pressure-sensitive adhesive layer, and
        a back liner side comprising a roll stability layer which contacts said heat-activated adhesive layer when said adhesive tape assembly is formed into a roll, said roll stability layer comprising an ethylene vinyl acetate.

2. The adhesive tape assembly as set forth in claim 1, wherein said heat-activated adhesive layer has a contact surface which contacts said roll stability layer when said adhesive tape assembly is formed into a roll, and said contact surface has a smooth finish.

3. The adhesive tape assembly as set forth in claim 2, wherein said contact surface has an average surface roughness of up to about 26 microinches (0.00066 mm).

4. The adhesive tape assembly as set forth in claim 1, wherein said heat-activated adhesive layer comprises an olefinic material.

5. The adhesive tape assembly as set forth in claim 1, wherein said heat-activated adhesive layer comprises at least one of polyethylene and polypropylene.

6. The adhesive tape assembly as set forth in claim 1, wherein said pressure-sensitive adhesive layer comprises an acrylic foam pressure-sensitive adhesive.

7. The adhesive tape assembly as set forth in claim 1, wherein said release layer comprises at least one of a medium density polyethylene, a low density polyethylene, a linear low density polyethylene and an ultra-low density polyethylene.

8. The adhesive tape assembly as set forth in claim 7, wherein said release liner further comprises an intermediate layer disposed between said release layer and said roll stability layer, said intermediate layer comprising a high density polyethylene.

9. The adhesive tape assembly as set forth in claim 1, wherein said release layer has a contact surface, in contact with said pressure-sensitive adhesive layer, which is coated with a release material.

10. The adhesive tape assembly as set forth in claim 1, wherein said ethylene vinyl acetate has a sufficiently low content of vinyl acetate that said roll stability layer does not block with said heat activated adhesive layer.

11. The adhesive tape assembly as set forth in claim 1, wherein said roll stability layer comprises an ethylene vinyl acetate having a vinyl acetate content of less than about 28% by weight.

12. The adhesive tape assembly as set forth in claim 1, wherein said roll stability layer comprises an ethylene vinyl acetate having a vinyl acetate content of about 5% to about 24% by weight.

13. The adhesive tape assembly as set forth in claim 1, wherein said roll stability layer comprises an ethylene vinyl acetate having a vinyl acetate content of about 8% to about 20% by weight.

14. The adhesive tape assembly as set forth in claim 1, wherein said roll stability layer comprises an ethylene vinyl acetate having a vinyl acetate content of about 12% by weight.

15. An adhesive tape assembly comprising:
    a double-sided adhesive tape comprising:
        a front adhesive side comprising a heat-activated adhesive layer, and
        a back adhesive side comprising a pressure-sensitive adhesive layer; and
    a release liner comprising:
        a front liner side comprising a release layer in contact with, bonded to and removable from said pressure-sensitive adhesive layer, and a back liner side comprising a roll stability layer which contacts said heat-activated adhesive layer when said adhesive tape assembly is formed into a roll, said roll stability layer comprising an ethylene vinyl acetate, wherein said roll stability layer further comprises an anti-blocking agent in an amount so that a coefficient of friction of said roll stability layer, when measured against said heat-activated adhesive layer, remains substantially constant.

16. The adhesive tape assembly as set forth in claim 15, wherein said roll stability layer comprises up to about 5% by weight of an anti-blocking agent based on the amount of ethylene vinyl acetate present.

17. The adhesive tape assembly as set forth in claim 1, wherein said roll stability layer has a coefficient of friction greater than about 0.4, when measured against said heat-activated adhesive layer.

18. The adhesive tape assembly as set forth in claim 1, wherein said roll stability layer has a coefficient of friction of greater than about 0.5, when measured against said heat-activated adhesive layer.

19. The adhesive tape assembly as set forth in claim 1, wherein said roll stability layer has a coefficient of friction of a least about 0.55, when measured against said heat-activated adhesive layer.

20. The adhesive tape assembly as set forth in claim 1, wherein said adhesive tape assembly has a width and is wound into a roll, with said roll stability layer contacting said heat-activated adhesive layer, and said roll has an outer circumferential edge, a diameter that is at least about 20 times said width and does not fall apart when held suspended along said outer circumferential edge.

21. An adhesive tape assembly in the form of a roll, comprising:
a double-sided adhesive tape comprising:
a front adhesive side comprising a heat-activated adhesive layer of a polyolefin heat-activated adhesive, and
a back adhesive side comprising a pressure-sensitive adhesive layer of a pressure-sensitive adhesive; and
a release liner comprising:
a front liner side comprising a release layer in contact with, bonded to and removable from said pressure-sensitive adhesive layer, and
a back liner side comprising a roll stability layer which contacts said heat-activated adhesive layer, said roll stability layer having a contact surface which has a coefficient of friction, when measured against said heat-activated adhesive layer, which provides an increase in roll stability to said adhesive tape assembly when formed into a roll,
said roll having, a width, an outer circumferential edge, a diameter that is at least about 20 times said width and does not fall apart when held suspended along said outer circumferential edge.

22. A release liner comprising:
a front liner side comprising a release layer having a first exposed contact surface bondable to and removable from a pressure sensitive adhesive layer, said release layer comprising a polyolefin homopolymer; and
a back liner side comprising a roll stability layer having a second exposed contact surface for contacting a heat activated adhesive layer, said roll stability layer comprising an ethylene vinyl acetate.

23. The release liner as set forth in claim 22, wherein said release layer comprises a polyethylene having a density of up to about 0.92 g/cc.

24. The release liner as set forth in claim 22, wherein said release liner further comprises an intermediate layer disposed between said release layer and said roll stability layer, said intermediate layer having a higher density than said release layer.

25. The release liner as set forth in claim 22, wherein said roll stability layer comprises an ethylene vinyl acetate having a vinyl acetate content of less than about 28% by weight.

26. The release liner as set forth in claim 22, wherein said roll stability layer comprises an ethylene vinyl acetate having a vinyl acetate content of about 5% to about 24% by weight.

27. The release liner as set forth in claim 22, wherein said roll stability layer comprises an ethylene vinyl acetate having a vinyl acetate content in the range of about 8% to about 20% by weight.

28. The release liner as set forth in claim 22, wherein said roll stability layer comprises an ethylene vinyl acetate having a vinyl acetate content of about 12% by weight.

29. A release liner comprising:
a front liner side comprising a release layer having a first exposed contact surface bondable to and removable from a pressure sensitive adhesive layer; and
a back liner side comprising a roll stability layer having a second exposed contact surface for contacting a heat activated adhesive layer, said roll stability layer comprising an ethylene vinyl acetate;
wherein said roll stability layer further comprises an anti-blocking agent in an amount so that a coefficient of friction of said roll stability layer, when measured against said heat-activated adhesive layer, remains substantially constant.

30. The release liner as set forth in claim 29, wherein said roll stability layer comprises up to about 5% by weight of an anti-blocking agent based on the amount of ethylene vinyl acetate present.

31. The adhesive tape assembly as set forth in claim 1, wherein said release layer comprising a polyethylene having a density of up to about 0.92 g/cc.

32. The adhesive tape assembly as set forth in claim 1, wherein said release layer comprising a polyolefin having a contact surface, in contact with said pressure-sensitive adhesive layer, wherein the contact surface is coated with a silicone or fluorocarbon release material.

33. The adhesive tape assembly as set forth in claim 21, wherein said release layer comprising a polyethylene having a density of up to about 0.92 g/cc.

34. The adhesive tape assembly as set forth in claim 21, wherein said release layer comprising a polyolefin having a contact surface, in contact with said pressure-sensitive adhesive layer, wherein the contact surface is coated with a silicone or fluorocarbon release material.

35. A release liner comprising:
a front liner side comprising a release layer having a first exposed contact surface bondable to and removable from a pressure sensitive adhesive layer, said release layer comprising a low density polyethylene, a linear low density polyethylene, or an ultra-low density polyethylene; and
a back liner side comprising a roll stability layer having a second exposed contact surface for contacting a heat activated adhesive layer, said roll stability layer comprising an ethylene vinyl acetate.

36. The release liner as set forth in claim 35, wherein said roll stability layer comprises an ethylene vinyl acetate having a vinyl acetate content of about 5% to about 28% by weight.

37. The release liner as set forth in claim 36, wherein said roll stability layer comprises an ethylene vinyl acetate having a vinyl acetate content of about 12% by weight.

38. A release liner comprising:

a front liner side comprising a release layer having a first exposed contact surface bondable to and removable from a pressure sensitive adhesive layer, said release layer comprising a polyolefin coated with an outer layer of silicone or fluorocarbon release material; and a back liner side comprising a roll stability layer having a second exposed contact surface for contacting a heat activated adhesive layer, said roll stability layer comprising an ethylene vinyl acetate.

39. The release liner as set forth in claim 38, wherein said roll stability layer comprises an ethylene vinyl acetate having a vinyl acetate content of about 5% to about 28% by weight.

* * * * *

UNITED STATES PATENT AND TRADEMARK OFFICE
CERTIFICATE OF CORRECTION

PATENT NO.    : 6,365,254 B1
DATED         : April 2, 2002
INVENTOR(S)   : Zoller, Panu K.

It is certified that error appears in the above-identified patent and that said Letters Patent is hereby corrected as shown below:

<u>Column 7,</u>
Line 26, delete "Pig." and insert in place thereof -- Fig. --.
Line 46, delete "III® ("  and insert in place thereof -- III® --.

Signed and Sealed this

Twenty-fifth Day of November, 2003

JAMES E. ROGAN
*Director of the United States Patent and Trademark Office*